M. W. HAZELTON.
DEVICES FOR DECOMPOSING WATER FOR FUEL.
No. 178,635. Patented June 13, 1876.
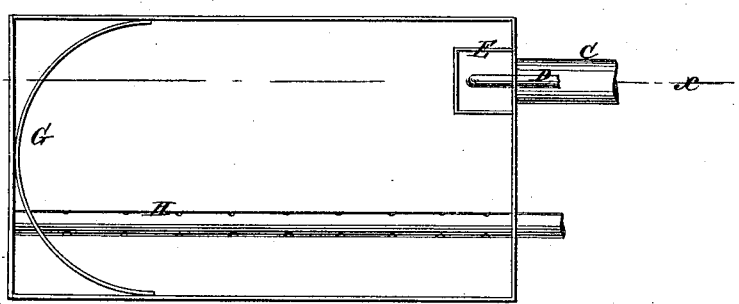
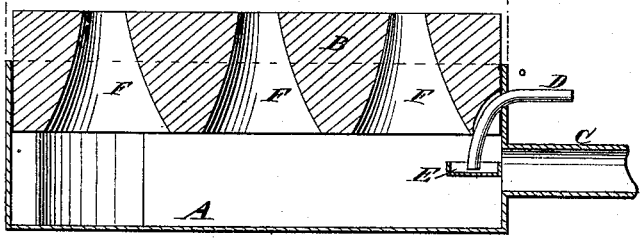

UNITED STATES PATENT OFFICE.

MILTON W. HAZELTON, OF CHICAGO, ILLINOIS.

IMPROVEMENT IN DEVICES FOR DECOMPOSING WATER FOR FUEL.

Specification forming part of Letters Patent No. 178,635, dated June 13, 1876; application filed May 16, 1876.

*To all whom it may concern:*

Be it known that I, MILTON W. HAZELTON, of Chicago, in the county of Cook and State of Illinois, have invented a new and Improved Apparatus for Burning Water, of which the following is a specification:

My invention consists of a tight pan under the fire-grate, into which an air-pipe from a fan-blower and a water-pipe enter below holes of conical form in the grate for developing water into spray and driving the spray through the holes into the fire above, so that it will contract by the compression of the air in the narrow portion of the holes, and expand on emerging from the holes, so as to break up the particles already broken to a certain degree in the pan below, and thus make it more sensitive to the heat and capable of more instantaneous decomposition for burning the hydrogen gas thereby developed along with fine coal and other like fuel not suitable for burning alone.

Figure 1 is a plan view of my improved apparatus, and Fig. 2 is a longitudinal sectional elevation, taken on line *x x* of Fig. 1.

A is the tight ash-pan under the grate B. C is the inlet-pipe for air from a fan-blower; D, inlet-pipe for water; E, a pan on which the water is delivered to be blown into spray by the air; and F represents conical holes in the grate-bars for the passage of the air and spray from the pan A up into the fire. G is a curved rear end of the pan designed to facilitate the circulation of the air in the pan for the better development of the spray, and H is a perforated pipe entering the pan for applying another blast of air in case of need. The fine coal burning on the top of the grate at a temperature of, say, two thousand degrees of heat will receive these fine particles of water, which will thereby be instantly raised from, say, sixty degrees to fifteen hundred or two thousand, and expanded seventeen hundred times, which sudden changes for the moment separate the gases and place them in condition to cause the heat in the coal to consume the oxygen in maintaining combustion, and, at the same time, the hydrogen gas will mix with the air supplied by the blower, and will be consumed.

Having thus described my invention, what I claim as new, and desire to secure by Letters Patent, is—

1. The combination of tight pan A, air-pipe C, water-pipe D, and spraying-pan E, with a fire-grate having conical holes F, substantially as specified.

2. The pan A, having the curved end G, in combination with the air and water pipes, pan E, and the grate having the conical holes F, substantially as specified.

MILTON W. HAZELTON.

Witnesses:
 E. C. DOUGHERTY,
 J. H. EGGERT.